April 21, 1936.  F. C. FRANK  2,038,211
WHEEL
Filed Dec. 21, 1931
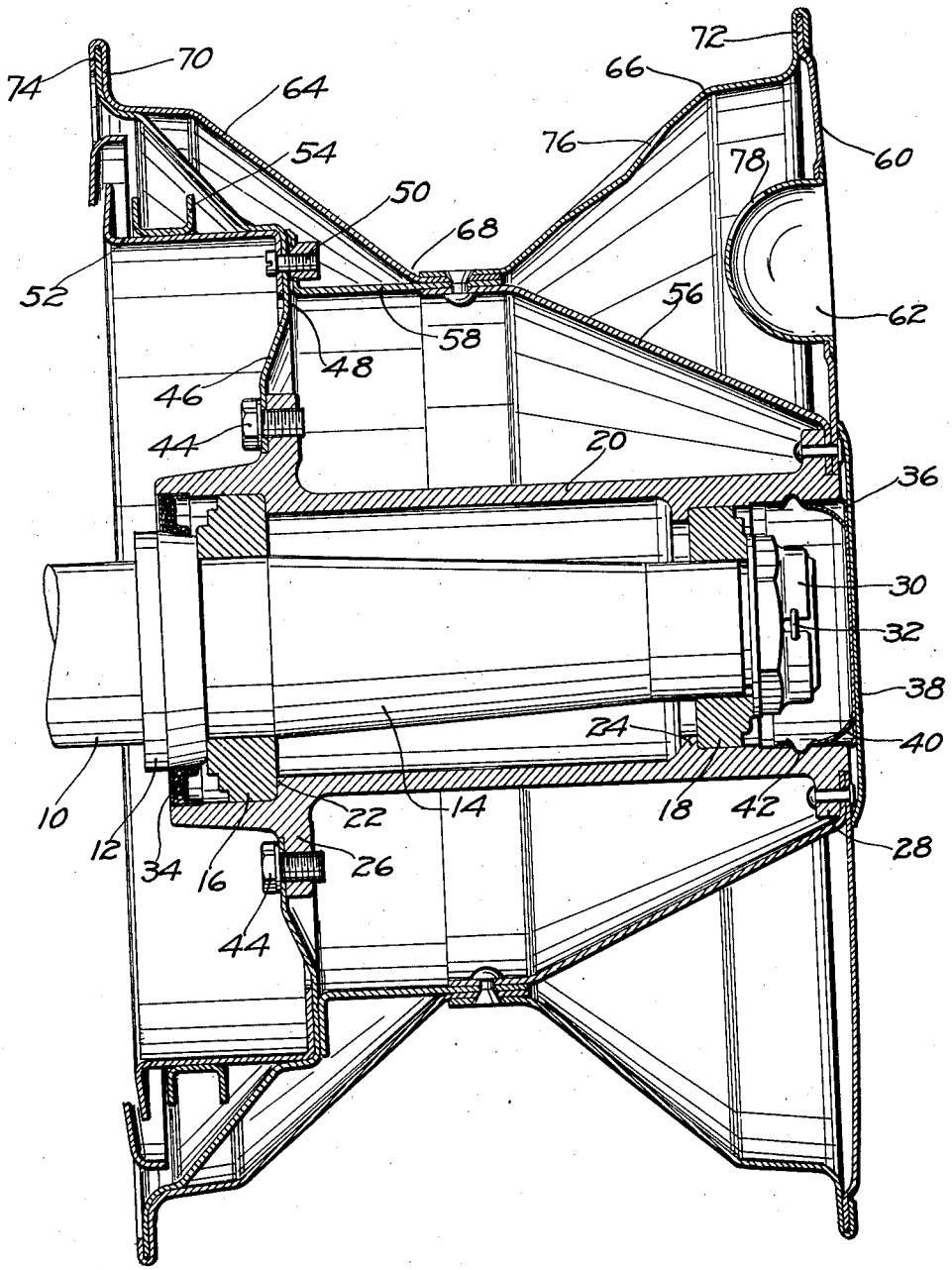
INVENTOR.
FREDERICK C. FRANK
BY O. H. Fowler
ATTORNEY Patented Apr. 21, 1936

2,038,211

UNITED STATES PATENT OFFICE 2,038,211

WHEEL

Frederick C. Frank, South Bend, Ind., assignor to Bendix Aviation Corporation, South Bend, Ind., a corporation of Delaware Application December 21, 1931, Serial No. 582,446

4 Claims. (Cl. 301—63)

This invention relates to wheels and more particularly to wheels primarily designed for low pressure tires.

Broadly, the invention comprehends a hub casting of an aluminum alloy. The hub has riveted or otherwise secured thereto radial load carrying discs. A conical member is suitably secured to the hub. This member extends inwardly over the hub and terminates in a cylindrical section secured to one of the radial load carrying discs. A rim for the wheel comprises two conical parts having telescoping cylindrical flanges and peripheral flanges turned to embrace the peripheries of the respective radial load carrying discs.

An object of the invention is to provide a wheel the component parts of which include a plurality of conical stampings arranged to provide a substantial structure.

Another object of the invention is to provide a wheel comprising a cast hub, radial load carrying discs suitably secured to the hub and a plurality of conical stampings arranged to effectively support the radial load carrying discs and to provide a rim.

Another object of the invention is to provide a radial load carrying disc with an offset portion arranged to receive and center a brake drum.

Another object of the invention is to provide a brake drum having means associated therewith for dissipating heat generated in the drum, due to the braking action of the friction element, and for lending strength and rigidity to the drum.

A feature of the invention is a wheel structure including a plurality of conical members so arranged with respect to each other that radial and side loads may be received without injury to the wheel.

Another feature of the invention is a wheel having a radial load carrying disc provided with an offset portion affording means for centering the brake drum.

Another feature of the invention is a wheel having radial load carrying discs and a rim including two conical stampings arranged to provide a drop center and retaining flanges turned to embrace the radial load carrying discs.

Other objects and features of the invention will appear from the following description taken in connection with the drawing forming a part of this specification.

The drawing is a vertical sectional view of a wheel embodying the invention.

Referring to the drawing for more specific details of the invention, 10 represents an axle having a shoulder 12 and a spindle 14. A wheel is supported for rotation on the axle by the conventional bearings 16 and 18 arranged in spaced relation one against the shoulder and the other near the end of the spindle.

The wheels include a hub 20 preferably cast of an aluminum alloy. As shown, the hub is cylindrical and is provided with interior shoulders 22 and 24 and circumferential flanges 26 and 28. The shoulders 22 and 24 are in thrust engagement with the bearings 16 and 18, and the hub is retained on the spindle by a nut 30 locked against displacement by the conventional cotter pin 32.

A grease retaining and dust washer 34 slipped in the rear end of the hub engages the shoulder 12 on the axle 10, and a dust cap is fitted on the front end of the hub. The dust cap includes a disc 36 secured to a shell 38 fitted snugly in the hub, and the shell 38 has cut or stamped therefrom a plurality of tongues 40 bent to engage a groove 42 in the hub.

Secured to the flange 26 preferably by bolts 44 is a radial load carrying disc 46. This disc is cupped and is provided with an offset portion 48 to which is secured as by bolts 50 a braking flange 52 reinforced by a ring 54 preferably channel shape in cross section. This ring readily dissipates heat generated in the braking flange, and in addition thereto lends stiffness and rigidity to the flange.

Suitably secured to the flange 28 is a cone shaped member 56 extending inwardly over the hub and a cylindrical member 58 connects the cone shaped member to the radial load carrying member 46. The member 58 has suitably secured thereto nuts for the bolts 50. These members are shown as two separate parts. They are usually so produced because of a manufacturing convenience. However, it is to be understood that they may be formed as a single part. The flange 28 also has secured thereto a radial load carrying disc 60 provided with a recess or pocket 62, the object of which will hereinafter appear.

Riveted or otherwise secured to members 56 and 58 are two conical stampings 64 and 66 arranged to provide a drop center rim 68 having flanges 72 and 74 rolled to embrace the peripheries of the load carrying discs 46 and 60. In the member 66 is an opening 76 registering with a similar opening 78 in the recess or depression 62. These openings receive the valve stem of an inner tube, not shown.

The crux of this invention is to be found in the conical members or sections arranged to effectively support the radical load carrying discs and to provide a suitable rim. It is to be observed that these conical members are of such structure that when assembled they provide in effect triangular shaped compartments which effectively truss the component parts of the wheel. It will be observed that the rim structure includes two conical members sleeved one on the other to provide a drop rim center and flanges which are deformed to embrace the radial load carrying discs.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention what I claim as new and desire to secure by Letters Patent is:—

1. A wheel comprising a member having a conical section and a cylindrical section, radial load carrying discs connected by the member, a rim supported by the load carrying discs including corresponding conical sections having overlapped substantially cylindrical parts adjacent said cylindrical section and secured thereto and peripheral flanges embracing the load carrying discs.

2. A wheel comprising a hub, a member having a conical section and a cylindrical section, radial load carrying discs secured to the hub and connected by the member, and a rim supported by the discs including two conical sections having telescoping parts adjacent said cylindrical section and secured thereto and peripheral flanges deformed to embrace the discs.

3. A wheel comprising a hub having spaced circumferential flanges, a conical member secured to one of the circumferential flanges having a cylindrical section formed integral therewith, a radial load carrying disc secured to the same flange, a radial load carrying disc secured to the other circumferential flange and secured to the cylindrical section, and a rim supported by the discs including two conical sections having telescopic parts adjacent said cylindrical section and secured thereto and peripheral flanges deformed to embrace the discs.

4. A wheel comprising a hub, radial load-carrying discs secured to and adjacent the ends of the hub, a rim member having a generally V section secured to said load-carrying discs along their peripheral edges, a conical member extending from one end of said hub to the center of said rim member, and a cylindrical section extending from said center to the disc member extending from the other end of said hub.

FREDERICK C. FRANK.